United States Patent

Sakai

[11] Patent Number: 5,099,971
[45] Date of Patent: Mar. 31, 1992

[54] DAMPER DEVICE OF A CLUTCH FOR A MOTOR VEHICLE

[75] Inventor: Yasuhito Sakai, Tokyo, Japan

[73] Assignee: Fuji Jukogyo Kabushiki Kaisha, Tokyo, Japan

[21] Appl. No.: 635,192

[22] Filed: Dec. 21, 1990

Related U.S. Application Data

[63] Continuation-in-part of Ser. No. 271,039, Nov. 14, 1988, abandoned.

[30] Foreign Application Priority Data

Nov. 27, 1987 [JP] Japan .................. 62-299339

[51] Int. Cl.⁵ .................. F16D 37/02; F16D 3/66
[52] U.S. Cl. .................. 192/21.5; 192/106.2
[58] Field of Search .................. 192/106.2, 21.5; 474/902; 403/224, 378, 379, 408.1, 152-153; 29/525.1; 411/338, 339, 383, 392, 900-902

[56] References Cited

U.S. PATENT DOCUMENTS

| 2,806,752 | 9/1957 | Ginn | 403/153 |
|---|---|---|---|
| 3,687,404 | 8/1972 | Werner | 403/224 |
| 3,961,813 | 6/1976 | Thomas | 403/224 X |
| 4,094,395 | 6/1978 | Brown | 192/106.2 |
| 4,197,931 | 4/1980 | Norcia | 192/106.2 |
| 4,351,167 | 9/1982 | Hanke et al. | 192/106.2 X |
| 4,537,297 | 8/1985 | Davies | 192/106.2 |
| 4,565,273 | 1/1986 | Tojima et al. | 192/106.2 |
| 4,616,740 | 10/1986 | Okamoto et al. | 192/21.5 |
| 4,627,144 | 12/1986 | Burke | 403/153 X |
| 4,629,353 | 12/1986 | Burke | 403/161 X |
| 4,674,991 | 6/1987 | Tojima et al. | 192/106.2 X |
| 4,739,864 | 4/1988 | Numazawa et al. | 192/106.1 X |
| 4,768,633 | 9/1988 | Kubo et al. | 192/106.2 X |
| 4,838,107 | 6/1989 | Herrmann | 192/106.2 X |
| 4,840,262 | 6/1989 | Herrmann | 192/106.2 |

FOREIGN PATENT DOCUMENTS

| 3446349 | 7/1985 | Fed. Rep. of Germany . | |
|---|---|---|---|
| 60-136626 | 7/1985 | Japan . | |
| 1551850 | 9/1979 | United Kingdom | 403/224 |
| 2141206 | 12/1984 | United Kingdom . | |
| 2189865 | 11/1987 | United Kingdom . | |

Primary Examiner—Rodney H. Bonck
Attorney, Agent, or Firm—Martin A. Farber

[57] ABSTRACT

A damper device of a clutch has an annular driven member comprising a pair of disk members, a hub disposed in an annular space formed in the driven member, damper springs disposed between the driven member and the hub, and stopper pins, each secured to the driven member at both end portions thereof. The stopper pin comprises a pin body and a cylindrical collar mounted on the pin body. The pin body is made of soft steel and the collar is made of steel harder than the pin body and disposed to be abutted against the hub.

14 Claims, 4 Drawing Sheets

DAMPER DEVICE OF A CLUTCH FOR A MOTOR VEHICLE

RELATED APPLICATION

This is a continuation-in-part application of my co-pending patent application Ser. No. 07/271,039 filed Nov. 14, 1988, now abandoned.

BACKGROUND OF THE INVENTION

The present invention relates to a damper device provided in a clutch for a motor vehicle.

Japanese Patent Application Laid-open 60-136626 discloses a damper device of an electromagnetic clutch in which damper springs are disposed between a driven member and a hub of the clutch in tangential directions of the driven member, respectively. The springs operate to transmit the torque of the driven member to the hub. When the transmitting torque exceeds a predetermined value, stopper pins provided in the driven member are moved in the rotational direction to engage with the hub to transmit the torque. Each stopper pin is secured to the driven member at both ends thereof by staking, and a central part of the pin is engaged with the hub. Accordingly, the stopper pin must be made of soft metal for the staking at both ends thereof. However, the central part must be hardened by carburized quench hardening or induction hardening in order to prevent abrasion and wearing thereof. Further, in order to prevent both end portions from carburizing, an anti-carburizing process must be applied to end portions before the hardening process.

Accordingly, a number of steps are required to manufacture the stopper pin, which causes the cost to increase. Moreover, it is difficult to manufacture stopper pins to have uniform quality.

In a continuously variable belt drive automatic transmission of a motor vehicle having a small number of cylinders which has large peak engine torque, since the range of torque loaded on the damper spring is set to a small value compared with the above mentioned peak engine torque, the load range on the stopper pin becomes large. Accordingly, it is important for the automatic transmission to resolve the above described problems.

SUMMARY OF THE INVENTION

The object of the present invention is to provide a damper device of the clutch which can be easily manufactured, having uniform quality with a low cost, thereby satisfying the requirement for the clutch for the transmission of torque.

According to the present invention, there is provided a damper device of a clutch for a motor vehicle having an annular drive member, an annular driven member driven by the drive member, a hub disposed in an annular space formed in the driven member and having circularly disposed openings and spaces, damper springs tangentially disposed in the respective openings and interposed between the driven member and the hub, and axially and circularly disposed stopper pins, each secured to the driven member at both end portions thereof, each stopper pin being passed through a space of said spaces of the hub.

The device comprises the stopper pin comprising a pin body and a cylindrical collar mounted on the pin body, the pin body being made of soft steel which can withstand a plastic working thereon, and the collar being made of steel harder than the pin body and disposed to be abutted against said inside wall of said space of the hub.

In an aspect of the invention, the driven member comprises a pair of disk members, and the pin body is secured to the disk members by staking, and the collar is secured to at least one of the disk members.

The other objects and features of this invention will become understood from the following description with reference to the, accompanying drawings.

DETAILED DESCRIPTION OF THE PREFERRED EMBODIMENTS

Figure 1:
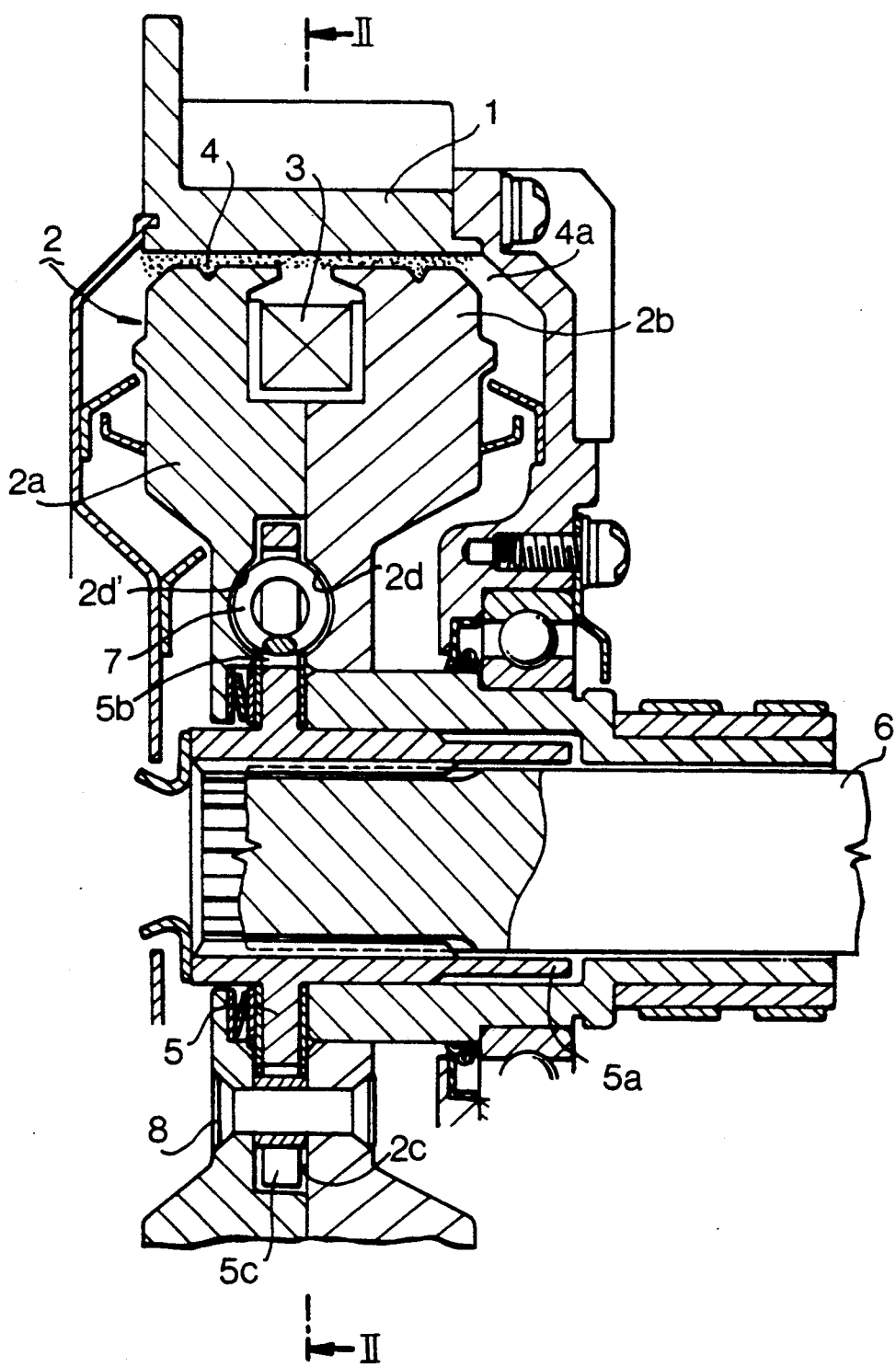
FIG. 1 is a sectional side view of an electromagnetic powder clutch having a damper device according to the present invention.
Figure 2:
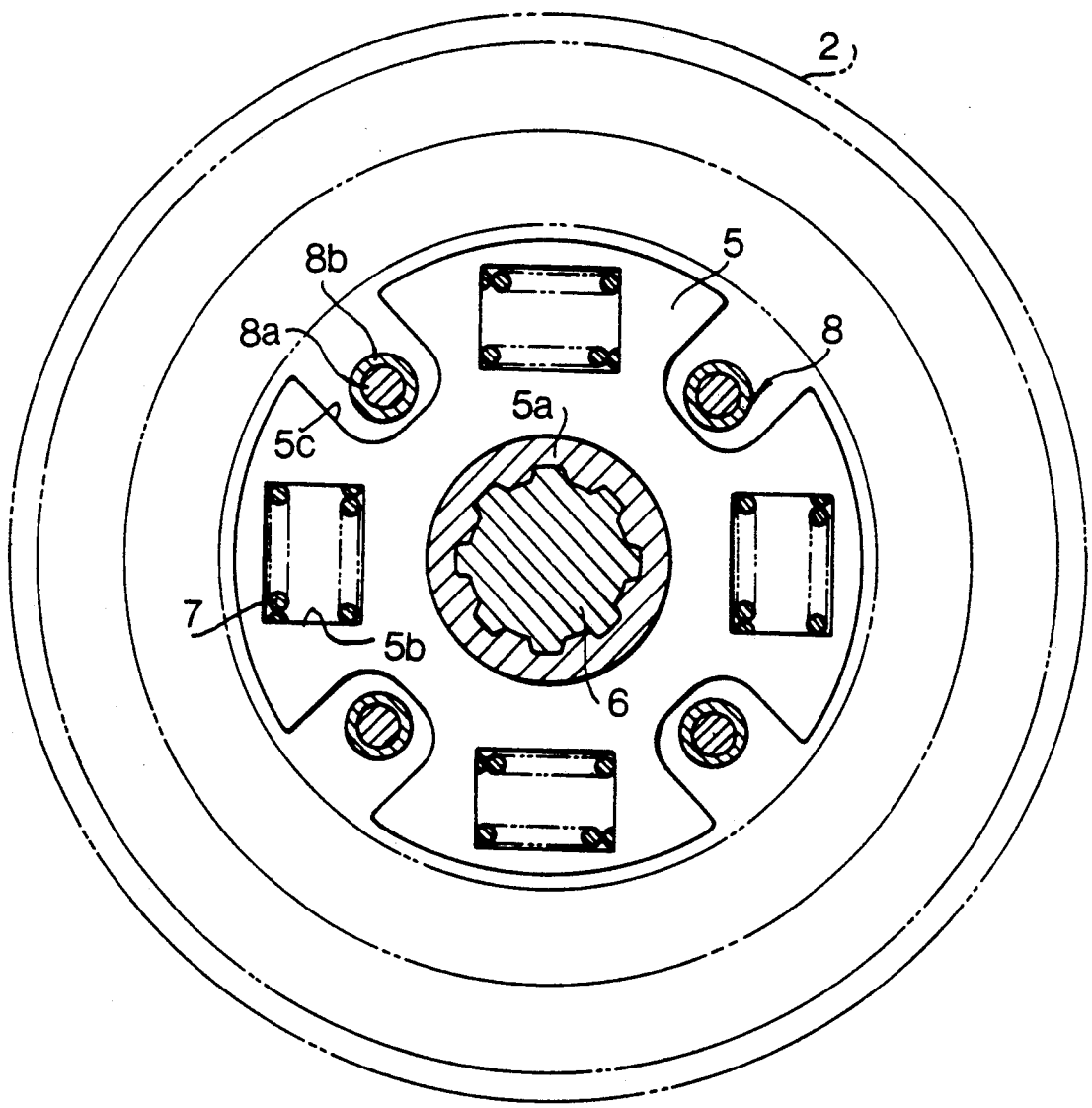
FIG. 2 is a sectional view taken along a line II—II of FIG. 1.

Referring to FIGS. 1 and 2, an electromagnetic powder clutch comprises an annular drive member 1 connected to a crankshaft of an engine (not shown), an annular driven member 2 comprising a pair of disk members 2a and 2b, a magnetizing coil 3 provided in the driven member 2. A gap 4a is defined between the drive member 1 and the driven member 2. Magnetic powder material 4 is provided in the gap 4a.

When the magnetizing coil 3 is excited by the clutch current, the driven member 2 is magnetized to produce a magnetic flux passing through the gap and the drive member 1. The magnetic powder is aggregated in the gap 4a by the magnetic flux and the driven member 2 is engaged with the drive member 1 through the powder 4. Thus, the engine torque is transmitted from the drive member 1 to the driven member 2.

The disk member 2a has an annular recess 2c radially formed adjacent the disk member 2b to define a disk receiving space between the disk members 2a and 2b. A clutch hub 5 is inserted in the space. The clutch hub 5 has a boss 5a splined to an input shaft 6 of a transmission.

As shown in FIG. 2, the hub 5 has a plurality of rectangular openings 5b and indentations (spaces) 5c formed on the outer periphery thereof. The openings 5b and indentations 5c are circularly and alternately disposed. The disk members 2a and 2b have the opposite recesses 2d' and 2d corresponding to the openings 5b, each of the opposite recesses defining a spring receiving space in which a damper spring 7 in the form of a compression coil spring is tangentially disclosed between the driven member 2 and the hub 5. The damper spring 7 is provided for damping shock when the power of the engine is transmitted from the driven member 2 to the clutch hub 5. A stopper pin 8 is axially disposed and secured to the disk members 2a and 2b at a position in the indentations 5c of the hub 5.

Figure 3:
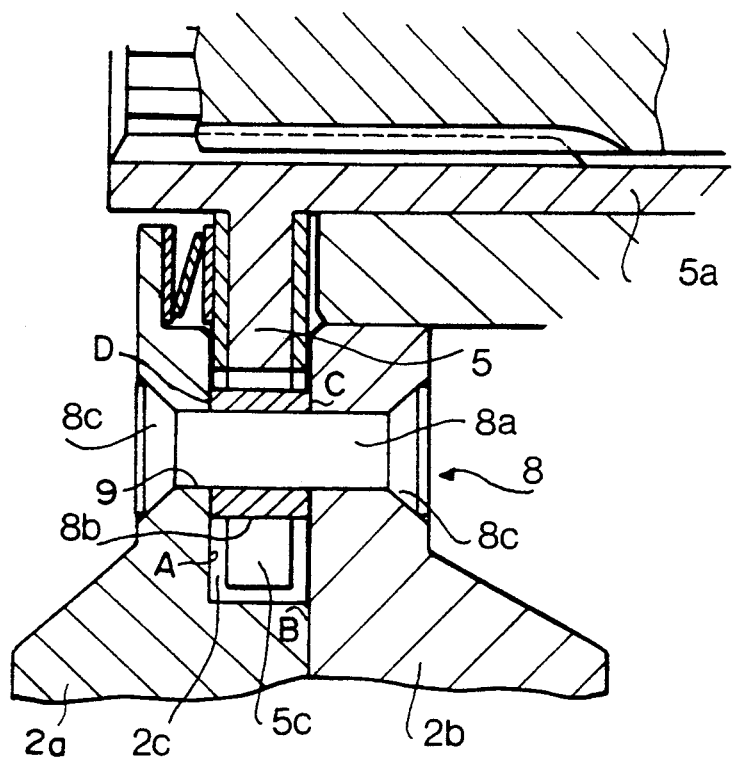
FIG. 3 enlarged sectional view showing a main part of the clutch at the region of the stopper pin.

Referring to FIG. 3, the stopper pin 8 comprises a pin body 8a secured to disk members 2a and 2b, and a cylindrical collar 8b loosely or tightly mounted on the pin body 8a. The pin body 8a is made of soft steel capable of plastic working. The collar 8b is made of steel of abrasion resistance material having a higher hardness than that of the pin body 8a, such as carburized quench hardening steel. Both ends of the pin body 8a are secured to the disk members 2a and 2b by staking 8c and the collar 8b is interposed between the disk members 2a and 2b. The stopper pin 8 is disposed to be angularly displaceable within the indentation 5c.

In operation of the clutch, when the coil 3 is excited, the drive member 1 is engaged with the driven member 2 through the powder 4 to transmit the engine torque.

When the transmitting torque is lower than a predetermined value, the torque is transmitted to the hub 5 through the damper springs 7, for providing a damping effect.

When the torque reaches the predetermined value, each stopper pin 8 engages with an inner wall of the indentation 5c, and the torque from the driven member 2 is transmitted to the hub 5 through the stopper pin 8.

Figure 4:
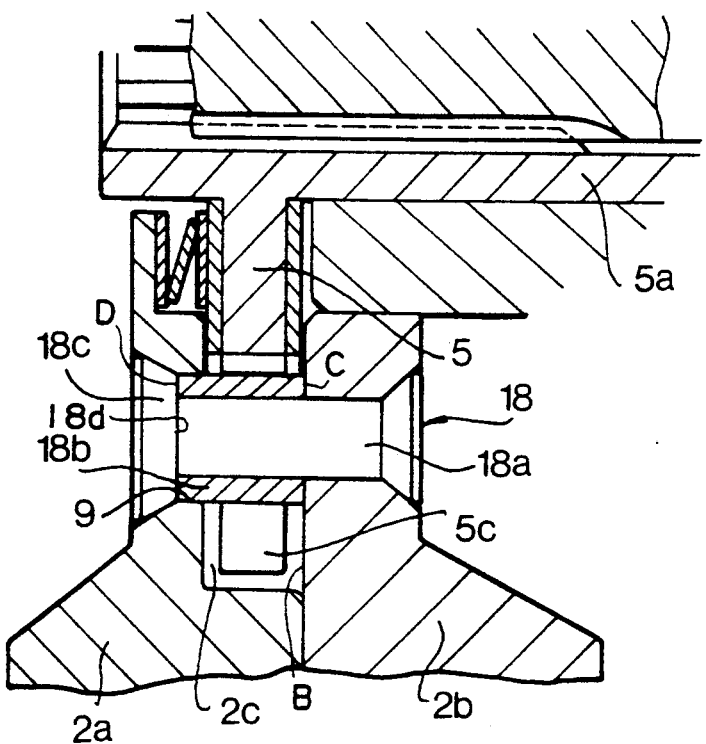
FIG. 4 is an enlarged sectional view showing a main part of a modification of the present invention.
Figure 5:
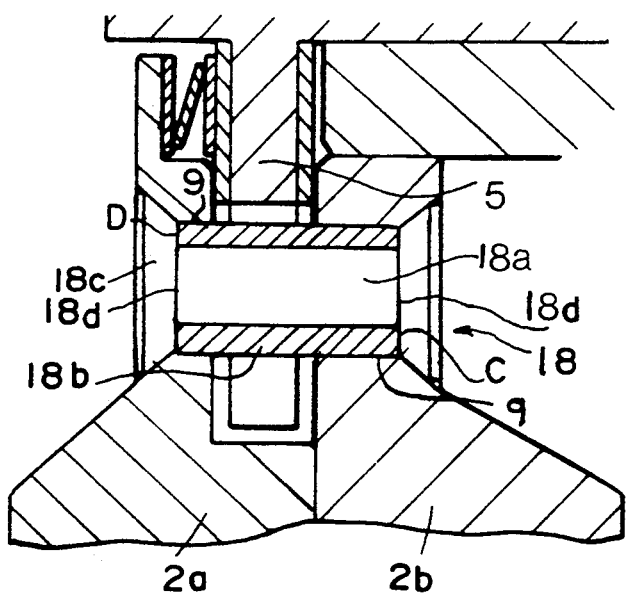
FIG. 5 is a view similar to FIG. 4 but showing a modification of FIG. 4.

FIG. 4 shows a modification of the stopper pin of the present invention. A stopper pin 18 has a pin body 18a having a head 18c and a collar 18b. The collar 18b engages with the pin body 18a and the neck 18d of the head 18c and is engaged with an inside wall of a hole 9 formed in the disk member 2a. Thus, the torque from the driven member 2 is directly exerted on the collar 18b, thereby reducing the load on the pin body 18a. The collar 18b at both end portions thereof may be engaged with the disk members 2a and 2b in holes 9 formed in the disk members 2a and 2b (FIG. 5).

At least one of the disks (e.g. 2b) has a first disk wall (e.g. B—FIGS. 3, 4) facing the other of said disks (e.g. 2a), the first disk wall engaging (at C) one end (C) of the collar (8b, 18b), and the other end (D) of the collar is securable (at D) at (i.e., directly or adjacent) the other disk (e.g. 2a) of the driven member 2.

In FIGS. 3, 4 one end (C) of the collar (e.g. 8b, 18b) is engaged (at C) with or abuts one of the disks (e.g. 2b) of the driven member 2 at disk wall B and the other end (D) of the collar is engaged or abutted, i.e., is secured (e.g. at D) by disk wall A of the other disk (e.g. 2a-FIG. 3) or by the neck 18d of the head 18c of the pin 18, FIG. 4 when staking. Both ends D and C of the collar (e.g. 18b, 18b) engage or abut on corresponding members (e.g. 2a and 2b, FIG. 3, or 18d and 2b, FIG. 4; also in FIG. 5, 18d, 18d) so that the collar is automatically positioned by staking. By the staking both disks 2a and 2b are closed to both ends C, D of the collar by the staking (this is the positioning of the collar).

Only one end of the pin can be staked in a modification of the invention. Since the pin of the present invention has a constant diameter, the following simple assembly of the device can be accomplished.

First, one starts with a totally cylindrical pin (not shown). Then one end (.e.g the left end) of the pin (e.g. 8, 18) is initially deformed into a frustoconical shape (e.g. 8c 18c) so as to fit the cone recess of one of the disks (e.g. 2a) as would be formed at staking. The righthand end of the pin remains cylindrical and is not defined. Then, the disk (2a) is placed on the pin over the non-deformed (right-hand) end or the pin with its non-deformed (e.g. right-hand) end is placed through the hole 9 in the disk (2a). Next the collar (8b, 18b) and thereafter the disk (2b) are engaged with the pin (8, 18) in that respective order (FIGS. 3, 4). In FIG. 5 the disk (2b) is engaged only with the collar 18b at its inside wall of its hole 9. But in the embodiments of FIGS. 3 and 4 the inner wall B of the disk 2b also engages the end C of the collar (8b, 18b). Then by staking only the nondeformed (right-hand) end of the pin, the device is assembled.

In accordance with the present invention, the stopper pin comprises of a collar made of hard steel and a pin body made of soft steel. Since the collar abuts on the hub, the pin body is prevented from abrasion and wearing. Further, both ends of the pin body are secured to the driven member by staking so that assembling of the pin to the driven member is easily performed. Accordingly, it is possible to manufacture the stopper pin uniformly in quality. Since both ends of the collar abut on corresponding members at staking, the collar is automatically positioned.

While the presently preferred embodiment of the present invention have been shown and described, it is to be understood that this disclosure is for the purpose of illustration and that various charges and modifications may be made without departing from the scope of the invention as set forth in the appended claims.

What is claimed is:

1. In a damper device of an electromagnetic powder clutch for a motor vehicle, the clutch having an annular drive member connected to a crankshaft of an engine, an annular driven member disposed adjacent to said drive member, said driven member comprising a pair of disks, a coil provided in one of said members, magnetic powder in a gap defined between said drive member and said driven member, a hub connected to an output shaft and disposed in an annular spacing formed in said driven member, said hub having openings and spaces, damper springs disposed in corresponding said openings and interposed between said driven member and said hub, and axially disposed stopper pins passing through corresponding said spaces of said hub, the improvement in the device wherein each said stopper pin comprises a pin body having a constant diameter and being made of soft steel capable of being plastically worked to secure both ends of the pin body to said disks of said driven member by staking, and a cylindrical collar mounted on said pin body and being made of steel of abrasion resistance material harder than said pin body, said collar being operatively abutable against an inner wall of a corresponding said space of the hub, and at least one of said disks has a first disk wall facing the other of said disks, one end of said collar being securable at said one disk, and the other end of said collar being securable at the other disk of said driven member.

2. The damper device according to claim 1, wherein said collar is engaged with an inside wall of a hole formed in at least one of said disks so as to reduce torque of the driving member directly exerted on the collar and to reduce load on the pin body.

3. The damper device according to claim 1, wherein said collar is tightly mounted around the pin body.

4. The damper device according to claim 1, wherein said collar is loosely mounted around said pin body.

5. The damper device according to claim 1, wherein said spaces form peripheral indentations in said hub.

6. The damper device according to claim 1, wherein said openings and said spaces respectively are spaced apart substantially along a circular locus on said hub, and said stopper pins are spaced apart substantially along a circular locus on said hub.

7. The damper device according to claim 6, wherein said damper springs are tangentially disposed in said openings.

8. The damper device according to claim 6, wherein said openings and said spaces are alternatively arranged along said circular locus.

9. The damper device according to claim 1, wherein said one end and said other end of said collar abutting a respective facing side of each disk, said facing side of each disk comprising a corresponding said first disk wall.

10. The damper device according to claim 1, wherein each of said spaces is wider than the other diameter of said collar.

11. The damper device according to claim 1, wherein each of said spaces is radially larger than the outer diameter of said collar.

12. The damper device according to claim 1, wherein the other of said disks has a second disk wall facing said first disk wall, said first and second disk walls abutting the one end and said other end of said collar, respectively, so as to interpose said collar between said disks.

13. The damper device according to claim 1, wherein each of said disks has an inside wall forming an annularly enlarged hole through which said pin body extends adjacent both ends to a head of said pin body, and said collar engages said pin body, said collar extends through said enlarged hole of each of said disks, and an end of said collar abuts a flat portion of said head of said pin body, and an outer periphery of said end of said collar engages said inside wall of said enlarged hole, whereby torque from the driven member is directly exerted on said collar, thereby reducing load on said pin body.

14. In a damper device of an electromagnetic powder clutch for a motor vehicle, the clutch having an annular drive member connected to a crankshaft of an engine, an annular driven member disposed adjacent to said drive member, said driven member comprising a pair of disks, a coil provided in one of said members, magnetic powder in a gap defined between said drive member and said driven member, a hub connected to an output shaft and disposed in an annular spacing formed in said driven member, said hub having openings and spaces, damper springs disposed in corresponding said openings and interposed between said driven member and said hub, and axially disposed stopper pins passing through corresponding said spaces of said hub, the improvement in the device wherein each said stopper pin comprises a pin body having a constant diameter and being made of soft steel capable of being plastically worked to secure both ends of the pin body to said disks respectively of said driven member, at least one end being secured by staking, and a cylindrical collar mounted on said pin body and being made of steel of abrasion resistance material harder than said pin body, said collar being operatively abutable against an inner wall of a corresponding said space of the hub, and each of said disks has a first disk wall facing the other of said disks, one end of said collar being securable at one of said disks, and the other end of said collar being securable at the other one of said disks of said driven member, said ends of the pin body being secured to said disks respectively with at least one of said ends of the pin body being staked to a corresponding of said disks, said collar being automatically positioned and stopped from lateral shifting by the staking of said stopper pin to said driven member with said ends of said collar abuttingly secured to a neck of a head of said pin and/or said first disk wall.

* * * * *